(12) United States Patent
Maciejewski

(10) Patent No.: US 7,980,356 B2
(45) Date of Patent: Jul. 19, 2011

(54) CLADDING PART FOR COMPONENT

(75) Inventor: Bernd Maciejewski, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/386,077

(22) Filed: Apr. 14, 2009

(65) Prior Publication Data

US 2009/0260917 A1    Oct. 22, 2009

(30) Foreign Application Priority Data

Apr. 17, 2008  (DE) .................. 10 2008 019 376

(51) Int. Cl.
| A47B 81/06 | (2006.01) |
| B32B 1/04 | (2006.01) |
| B32B 7/02 | (2006.01) |
| B32B 27/00 | (2006.01) |
| F02B 77/13 | (2006.01) |
| F16F 15/00 | (2006.01) |
| G10K 11/04 | (2006.01) |

(52) U.S. Cl. ........ 181/207; 181/198; 181/199; 181/200; 181/204; 181/208; 181/209; 428/76; 428/215; 428/421

(58) Field of Classification Search .................. 181/207, 181/198, 199, 200, 204, 208, 209; 428/76, 428/215, 421
See application file for complete search history.

(56) References Cited

U.S. PATENT DOCUMENTS

| 4,048,366 | A | * | 9/1977 | Kingsbury | 428/215 |
| 4,190,131 | A | * | 2/1980 | Robinson | 181/296 |
| 4,201,297 | A | * | 5/1980 | Datwyler | 206/349 |
| 5,063,098 | A | * | 11/1991 | Niwa et al. | 428/76 |
| 6,173,805 | B1 | * | 1/2001 | Thomasen | 181/207 |
| 6,260,319 | B1 | * | 7/2001 | Colomban | 52/404.1 |
| 6,291,754 | B1 | * | 9/2001 | Gatzen et al. | 84/411 M |
| 6,302,857 | B1 | * | 10/2001 | Landeck | 601/4 |
| 6,882,547 | B2 | * | 4/2005 | Arz | 361/816 |
| 2001/0008193 | A1 | * | 7/2001 | Moitzheim et al. | 181/200 |
| 2002/0017750 | A1 | * | 2/2002 | Miyamoto | 267/219 |
| 2002/0045018 | A1 | * | 4/2002 | Simons et al. | 428/40.1 |
| 2002/0046659 | A1 | * | 4/2002 | Smith | 99/422 |
| 2002/0070074 | A1 | * | 6/2002 | Bongiovi, Jr. | 181/207 |
| 2002/0179419 | A1 | * | 12/2002 | Tomlinson et al. | 198/860.1 |
| 2003/0016018 | A1 | * | 1/2003 | Arz | 324/322 |
| 2003/0016518 | A1 | * | 1/2003 | Arz | 361/818 |
| 2003/0088172 | A1 | * | 5/2003 | Kuth | 600/407 |
| 2003/0175497 | A1 | * | 9/2003 | Kobe et al. | 428/317.9 |
| 2004/0051219 | A1 | * | 3/2004 | Sherwin et al. | 267/136 |
| 2007/0071957 | A1 | * | 3/2007 | Atkins et al. | 428/292.1 |

(Continued)

FOREIGN PATENT DOCUMENTS

DE    4301984 A1    7/1994

(Continued)

OTHER PUBLICATIONS

D.D.L. Chung, Review Materials for vibration damping, Jul. 23, 2001, Journal of Materials Science 36 (2001), pp. 1-5.*

*Primary Examiner* — Jeffrey Donels
*Assistant Examiner* — Christina Russell

(57) ABSTRACT

The invention relates to a cladding part for components. The cladding part has at least two areas with different vibration damping properties. The different areas make it possible in a simple manner to meet partly conflicting requirements for cladding parts of the components in an optimum manner. The components include medical examination devices.

12 Claims, 1 Drawing Sheet

U.S. PATENT DOCUMENTS

| | | | |
|---|---|---|---|
| 2007/0151796 A1* | 7/2007 | Heid | 181/207 |
| 2008/0173754 A1* | 7/2008 | Strehlow et al. | 244/17.13 |
| 2008/0280086 A1* | 11/2008 | Sheridan et al. | 428/40.7 |
| 2009/0044212 A1* | 2/2009 | Dietz et al. | 720/651 |
| 2009/0188746 A1* | 7/2009 | Yamada et al. | 181/207 |
| 2009/0301811 A1* | 12/2009 | Wildhaber | 181/290 |
| 2009/0308270 A1* | 12/2009 | Cansler et al. | 101/169 |

FOREIGN PATENT DOCUMENTS

| | | |
|---|---|---|
| DE | 10134539 A1 | 2/2003 |
| DE | 10134540 C1 | 3/2003 |
| DE | 10147745 C2 | 4/2003 |
| DE | 10332833 B4 | 2/2005 |
| DE | 202006001654 U1 | 5/2006 |

* cited by examiner

CLADDING PART FOR COMPONENT

CROSS REFERENCE TO RELATED APPLICATIONS

This application claims priority of German application No. 10 2008 019 376.3 filed Apr. 17, 2008, which is incorporated by reference herein in its entirety.

FIELD OF THE INVENTION

The invention relates to a cladding part for a component.

BACKGROUND OF THE INVENTION

Cladding of components, especially medical examination devices such as computer tomography devices or magnetic resonance devices for example, or also for radiation therapy devices, in addition to improving the external appearance of said devices, also frequently serves to attenuate sound externally which is produced by the component during operation and which, without sound deadening or attenuation, can be perceived by a person located in the vicinity of the component as unpleasant noise. In a magnetic resonance device for example noise typically arises from interaction between a main field magnet and the gradient coils used for local encoding. With computer tomography devices and radiation therapy devices, noise can be generated for example during rotation of parts of the devices during an examination or treatment.

The noise arising will be transmitted directly or indirectly e.g. via the air surrounding the component, to cladding of the component, which also causes said cladding to vibrate, and thus passes on the noise and/or in its turn creates further noise.

Known cladding of just such medical examination devices is generally simply made from fiber-reinforced plastics, which thus possess a high mass and are therefore heavy, inherently rigid and not easy to handle. Although such cladding provides an attenuating mass to counter vibrations, it still directs noise unimpeded into the cladding.

Furthermore cladding is known which is also made of pure fiber-reinforced plastic and is additionally provided on the side facing the component with a sound-deadening layer made of foam. Thermoplastic cladding parts also exist which are manufactured using the single-sheet or twin-sheet method and sections of which are also provided with sound-deadening foam. Although this improves its vibration-damping properties, mass and thereby weight of the cladding continue to be impractical.

SUMMARY OF THE INVENTION

One object of the invention is thus to specify a cladding part for optimized cladding.

The object is achieved by a cladding part in accordance with the claims.

In such cases the cladding part comprises at least two areas with different vibration damping properties.

The different areas make it possible in a simple manner to fulfill in the optimum manner the sometimes conflicting requirements on cladding parts of components, especially medical examination devices.

Such requirements are for example that cladding parts of components should on the one hand, for better sound deadening and stability, be constructed to be as heavy and massive as possible, but on the other hand, for reasons of handling, especially for service measures, should be as light as possible.

Furthermore it is desirable from an economic standpoint for cladding parts to be constructed as simply as possible and thus be simple to manufacture. A suppression of body sound transmission within the cladding parts is also desirable. Inventive cladding parts will also easily meet these requirements and even make it possible in this case both to fulfill locally differing requirements e.g. regarding suppression of sound propagation or transfer.

BRIEF DESCRIPTION OF THE DRAWINGS

Further advantages and details of the present invention emerge from the exemplary embodiments described below, as well as with reference to the drawings. The outlined examples do not represent any restriction of the invention. The figures are as follows.

DETAILED DESCRIPTION OF THE INVENTION

Figure 1:
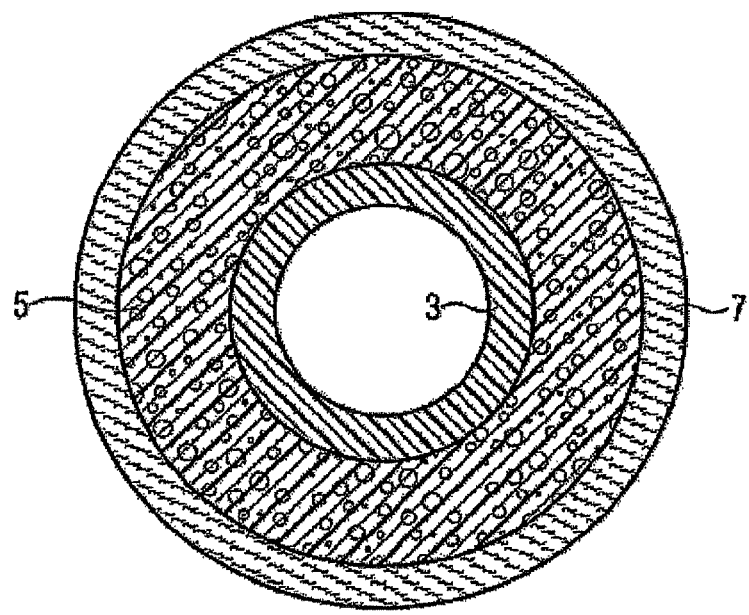
FIG. 1 a schematic diagram of a front view of a rear or front cladding part of a magnetic resonance device as an example of an inventive cladding part and FIG. 2 the rear or front cladding part from FIG. 1 in a longitudinal cross section.
Figure 2:
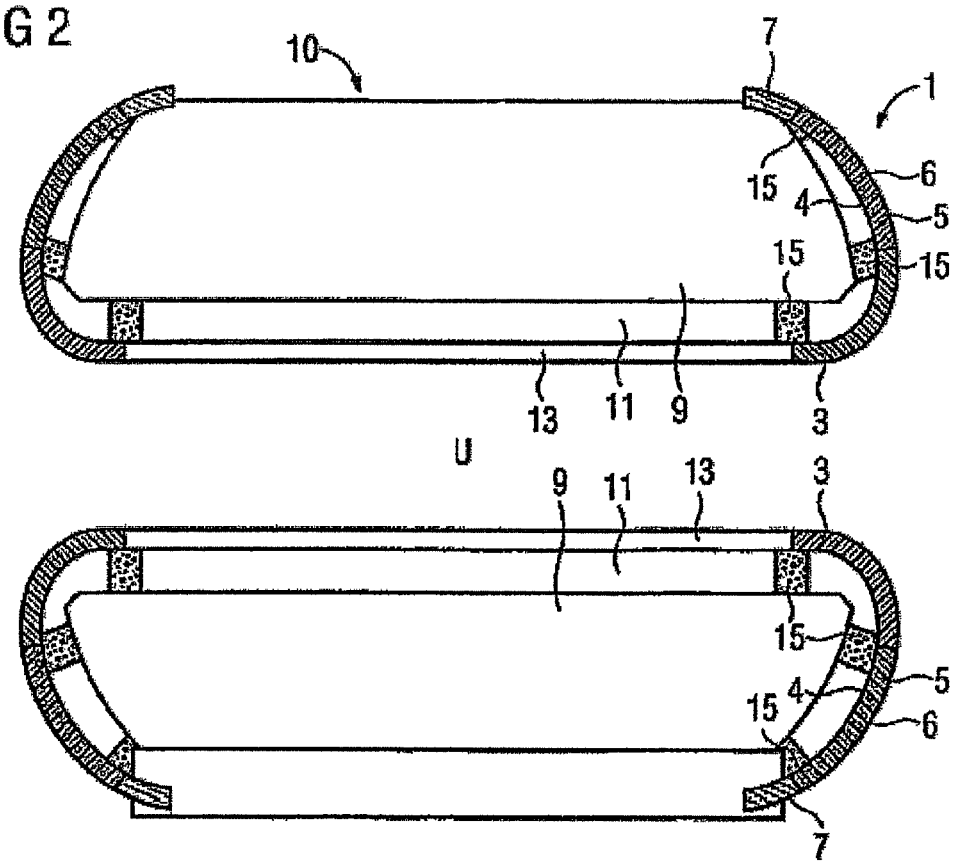

Without this being intended to represent any restriction, FIGS. 1 and 2 show, in a front view and in a longitudinal cross section respectively, a schematic diagram of an inventive cladding part 1 of a component 10 using front or rear cladding 1 of a magnetic resonance device 10 as an example.

The magnetic resonance device 10 especially comprises a cylindrical magnet 9 for creating a main magnetic field in an examination volume U of the magnetic resonance device 10. Furthermore the magnetic resonance device 10 comprises a gradient coil unit 11 for creating gradient fields in the examination volume U. During an examination the main magnetic field is overlaid for location encoding of the measurement data with rapidly switched magnetic gradient fields. In this case forces act between gradient coil unit 11 and magnet 9 which excite the gradient coil unit 11 and the external jacket of the magnet 9 into vibrations. Further elements of the magnetic resonance device 10 such as control units and the like for example are known and are not shown in the figure for reasons of clarity.

The component 10 to be clad, the magnetic resonance device 10 in this case, thus at least in some places, namely at least by the gradient coil unit 11, excites its environment into vibrations. The gradient coil unit 11 is protected from the examination volume U by inner cladding 13 for example.

In the example shown the cladding part 1 has three areas with different vibration damping characteristics 3, 5, 7. These are arranged in accordance with vibration excitation characteristics of the respective adjacent points of the component.

Through the vibrations of the gradient coil unit 11 sound is mostly emitted at the height of the gradient coil unit 11 viewed radially from the longitudinal axis of the magnetic resonance device 10. Viewed in a radial outwards direction, the intensity of this sound emission and thereby the excitation of vibrations in the environment become weaker. In a central area of the so-called "end spinnings" (=front face sides) of the magnets 9 the radiation is less high compared to the directly opposite the gradient coil unit 11 and is lowest in the outermost area.

Accordingly the areas 3, 5, 7 are arranged so that a first area 3 of the cladding part 1, which comprises materials for stiffening which have a high density, is located at the height of the gradient coil unit 11, i.e. in the active area of a high vibration excitation of the component 10. The high density of the first area 3 imparts to the cladding part 1 at this location the necessary mass to be able to cater for the main sound emission. Advantageously the first area 3 comprises fiber-reinforced plastic, especially glass fiber-reinforced plastic, e.g. polyester or epoxy resin and glass fibers.

The further areas 5, 7, which are arranged outside the main sound emission and are primarily excited into vibrations by air sound which exits from the gradient coil unit 11 comprise materials which have a lower density than materials in the first area 3.

In such cases especially the second area 5, which in an active area is assigned average vibration excitation by the component 10, comprises damping material with a vibration damping effect. On the one hand this has the advantage of the cladding part 1 being reduced in weight by the lower density of the materials and on the other hand the vibrations to which the cladding part 1 is excited by the sound transmitted by the gradient coil unit 11 are damped.

In this case it is advantageous for the damping material in the core of the area 5 of the cladding part 1 to be arranged so that especially an outer side 6 of the cladding part 1 is vibration-decoupled from an inner side 4 of the cladding part 1. In particular sound-deadening materials made from soft structures, for example damping foams, such as linear polyetherimide hard foam plastic, are suitable as sound-deadening materials.

In addition this exemplary embodiment shows a third area 7 of the cladding part 1 which also comprises materials of lower density. This third area 7 is arranged in the effective area of lower vibration excitation of the component 10 and primarily serves for further reduction of the total weight of the cladding part 1. The density of the material used here in the outer area 7 can even be less than that of the material used in the active area of medium vibration excitations, since here the vibration excitations by the component 10 are again smaller. Thus in this area 7 extremely cost-effective cell material can be used for reducing density. For example fleece, such as pressure-stable polyester fleece for example, is especially suitable in this case—because of its easy drapability for example.

The inventive cladding part 1 is thus optimized by arrangement of the different areas corresponding to the different vibration excitations by component 10 in respect of its vibration-damping characteristics and thereby of its sound-deadening characteristics. In addition the weight of the cladding part 1 is reduced 1 by using materials of lower density compared to conventional cladding parts, which facilitates handling of the cladding part 1. The costs for such a cladding part 1 can also be kept especially low by using low-cost materials of low density in areas 5 and 7.

This type of cladding part 1 can also be manufactured simply and cost-effectively. One example for a possible method of manufacturing such a cladding part 1 would for example be by means of a molded part for the cladding part 1, in which a 5-6 mm thick layer of glass fibers were arranged for the inner area 3 for example. In the adjacent central area 5 for example first of all a thin layer (appr. 14 mm) of glass fibers for stabilizing the outer side 6 of the cladding part 1, then a layer of damping material for vibration decoupling and weight reduction, e.g. sound-deadening foam of a thickness of appr. 3-4 mm, and another thin layer (appr. 14 mm) of glass fibers for stabilizing the inner side 4 of the cladding part 1 are arranged in a sandwich configuration. In the outer area 7 once again adjoining the central area 5, in a similar manner a appr. 3-4 mm thick layer of polyester fleece or another cost-effective and easily shapable material of lower density, which serves here only as a filler for weight reduction, is arranged between two thin layers (each appr. 14 mm) of glass fibers in the form of a sandwich. Now the cladding part 1 can be molded in the mold part, e.g. by means of an injection method with resin or another suitable plastic. In such cases the glass fibers serve as a flow aid inter alia. So that it is also made easier for the resin to flow around the sound-deadening foam, and in order to prevent the formation of sound bridges in the central area 5 (which would be caused especially by cavities within the sound-deadening foam for example), the sound-deadening foam can in each case be provided on its side facing the inner and outer side respectively with channels running across each other for example.

Such channeling of the sound deadening foam simultaneously advantageously increases the ability to shape the sound deadening-foam component, so that there is no need to shape the sound deadening foam before it is inserted into the mold. This applies particularly in connection with a material thickness of the sound deadening foam of only a few millimeters, such as in the example given.

In the example of a rear or front cladding part as cladding part 1 in particular the low curvature in the second area 5 facilitates the sandwich-type construction of the second area 5 with a core made of sound-deadening material.

Thus a cladding part 1 is produced which achieves a certain degree of stability by the through-layers of glass fiber-reinforced plastic on the inner and outer side 4, 6 of the cladding part 1 and simultaneously has the advantages already given above.

The said measurements, dimensions and configurations relate to the example of front and rear cladding 1 of a magnetic resonance device 10. For the person skilled in the art other cladding parts have other dimensions and arrangements of the different areas 3, 5, 7 easily recognizable depending on requirements.

In order to also suppress propagation of airborne sound between the component 10 and the cladding part 1, further barriers 15, e.g. made from sound-deadening foam or other noise-suppression materials, can be arranged at a suitable position between the component 10 and the cladding part 1. This relates especially to airborne sound at the loudest point, i.e. in the area of the gradient coil 11, which migrates outwards over the endspinnings (end faces of the component 10).

The invention claimed is:

1. A cladding part for a component, comprising:
   a first area having a first vibration-damping property; and
   a second area having a second vibration-damping property that is different to the first vibration-damping property;
   wherein the first area is positioned in a first region and the second area is positioned in a second region; and
   wherein the first vibration-damping property and the second vibration-damping property are arranged in accordance with a vibration excitation property of the component within the first region being greater than a vibration excitation property of the component within the second region, such that the first vibration-damping property of the first area is arranged to be greater than the second vibration-damping property of the second area, and
   wherein the first area of the cladding part comprises a material having a greater density than the second area, based on the vibration excitation property within the first region being greater than the vibration excitation property within the second region.

2. The cladding part as claimed in claim 1, wherein the first area of the cladding part comprises fiber-reinforced plastic.

3. The cladding part as claimed in claim 1, wherein the second area of the cladding part comprises a sound-deadening material for vibration decoupling.

4. The cladding part as claimed in claim 3, wherein an outer side of the cladding part is vibration decoupled from an inner side of the cladding part.

5. The cladding part as claimed in claim 3, wherein the sound-deadening material is a sound-deadening foam.

6. The cladding part as claimed in claim 5, wherein the sound-deadening foam is a linear polyetherimide hard foam material.

7. The cladding part as claimed in claim 1, further comprising a third area comprising a low-cost or a drapable material having a lower density than a material in the first area.

8. The cladding part as claimed in claim 1, wherein an outer side or an inner side of the cladding part comprises fiber-reinforced plastic for reinforcement.

9. The cladding part as claimed in claim 1, wherein the second area is a sandwich form comprising a material having a higher density and a material having a lower density.

10. The cladding part as claimed in claim 1, wherein the second area has a lower curvature than the first area.

11. The cladding part as claimed in claim 1, wherein the component comprises a medical examination device.

12. The cladding part as claimed in claim 1, wherein the cladding part takes an arcuate shape; wherein said first and second area are positioned at respective segments along the arcuate shape.

* * * * *